US 8,539,506 B2

(12) United States Patent
Fanning et al.

(10) Patent No.: US 8,539,506 B2
(45) Date of Patent: Sep. 17, 2013

(54) DYNAMIC INJECTION OF CODE INTO RUNNING PROCESS

(75) Inventors: Michael C. Fanning, Redmond, WA (US); Christopher M. H. Faucon, Redmond, WA (US); Andrew R. Sterland, Seattle, WA (US); Timothy S. Rice, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/370,126

(22) Filed: Feb. 9, 2012

(65) Prior Publication Data

US 2013/0212595 A1 Aug. 15, 2013

(51) Int. Cl.
*G06F 13/00* (2006.01)

(52) U.S. Cl.
USPC ............................ 719/313; 719/328; 717/111

(58) Field of Classification Search
USPC ................................. 719/313, 328; 717/111
See application file for complete search history.

(56) References Cited

U.S. PATENT DOCUMENTS

| 6,463,583 | B1 | 10/2002 | Hammond |
| 7,694,341 | B2 | 4/2010 | Mensch et al. |
| 7,886,287 | B1 | 2/2011 | Davda |
| 8,060,858 | B2 * | 11/2011 | Mitrov et al. ................. 717/107 |
| 2006/0206585 | A1 | 9/2006 | Lubin et al. |
| 2008/0040800 | A1 * | 2/2008 | Park ............................... 726/22 |
| 2008/0256513 | A1 | 10/2008 | Nathan et al. |
| 2008/0288962 | A1 | 11/2008 | Greifeneder et al. |
| 2008/0307391 | A1 | 12/2008 | Goel |
| 2009/0024986 | A1 | 1/2009 | Meijer et al. |
| 2012/0185794 | A1 * | 7/2012 | Qin et al. ...................... 715/779 |

FOREIGN PATENT DOCUMENTS

WO 2011/055945 A2 5/2011

OTHER PUBLICATIONS

Shpitalnik, Gregory, "Code Injection into Running Linux Application", Retrieved at <<http://www.codeproject.com/KB/DLL/code_injection.aspx, Feb. 12, 2009, pp. 8.
Gioachin, et al. "Dynamic High-Level Scripting in Parallel Applications", Retrieved at <<http://ieeexplore.ieee.org/stamp/stamp.jsp?tp=&arnumber=5161040>>, IEEE International Symposium on Parallel & Distributed Processing, May 23-29, 2009, pp. 1-11.
Kicherer, et al. "Extending a Light-weight Runtime System by Dynamic Instrumentation for Performance Evaluation", Retrieved at <<http://ieeexplore.ieee.org/stamp/stamp.jsp?tp=&arnumber=5759016>>, 23rd International Conference on Architecture of Computing Systems (ARCS), Feb. 22-23, 2010, pp. 1-6.
"Injecting Code Dynamically with the Debugging API", Retrieved at <<http://msdn.microsoft.com/en-us/library/bb384380.aspx>>, Retrieved Date: Dec. 29, 2011, pp. 4.
"International Search Report", Mailed Date: Apr. 29, 2013, Application No. PCT/US2013/024558, Filed date: Feb. 4, 2013, pp. 7.

* cited by examiner

*Primary Examiner* — Andy Ho (57) ABSTRACT

Techniques are described herein that are capable of dynamically injecting code into a running process. For instance, the techniques are capable of causing arbitrary code to be activated in the process while the process is running in response to receipt of a request for dynamic execution of the arbitrary code from outside the process while the process is running.

20 Claims, 7 Drawing Sheets

DYNAMIC INJECTION OF CODE INTO RUNNING PROCESS

BACKGROUND

A process, such as a computer program (e.g., a software application) or a portion thereof, may perform operations with respect to another process. The process that performs the operations is referred to as a requesting process, and the process on which the operations are performed is referred to as a targeted process. Traditionally, in order for a requesting process to attach to a target process, a contributor to a runtime environment in which the targeted process executes provides a targeted set of services for the requesting process or an activation mechanism for instantiating code within the targeted process. For instance, the contributor may be an operating system, a layered runtime (e.g., Common Language Runtime (CLR) distributed by Microsoft Corporation, Java Virtual Machine (JVM) distributed by Oracle Corporation, etc.), a host executable (e.g., a browser), an integrated framework (e.g., Windows Presentation Foundation (WPF)), etc. When an activation mechanism instantiates code (e.g., an object) within the targeted process, the code typically is callback code that receives notifications or is called with a reference to a host object that provides access to data and/or services. Such an activation mechanism traditionally is provided by consulting machine configuration information, such as a registry or an environment variable at start-up of the targeted process. The relevant code is then instantiated based on this information and initialized with relevant host-provided, data.

However, techniques for activating code in a targeted process at start-up of the targeted process have limitations. For instance, if the targeted process is not started with a configuration that references code, the targeted process typically is restarted after a configuration that references the code is set. Restarting the targeted process may introduce additional cost and/or steps to the user experience of activating the code. Also, circumstances that exist while the targeted process is running may be difficult to recreate once the target process is restarted. For example, problems such as thread race conditions, a slow memory leak that takes days to force an error, etc. are relatively serious but potentially difficult to reproduce. In another example, alterations of an execution environment implied by re-configuring the targeted process may prevent a problem from being reproduced at all.

Providing application programming interface (API) functionality to code of a requesting process may be relatively costly. For instance, production and maintenance of documentation, forward compatibility, etc. may contribute to the cost of a platform-provided API, Auxiliary functionality, such as tooling functionality, of a platform or framework often is regarded as having a relatively lower priority than the central functionality of the platform or framework. Accordingly, work that is to be performed for providing the auxiliary functionality may be deferred. For relatively complex platforms or frameworks, the expertise for providing core platform services versus the expertise for providing auxiliary services may not overlap. Such issues may limit development and/or innovation with regard to the auxiliary services. Code that is not strictly purposed for a platform and/or which possibly entails execution of arbitrary code (e.g., arbitrary tool code), as would be the case for public extension points, entails substantial security risk that may be mitigated by careful review and/or implementation. Finally, an API that is provided by an application or framework may entail servicing and/or versioning problems. For instance, providers of requesting processes often make adjustments to code thereof in an effort to keep in sync with changes to a platform, potentially recompiling and/or rewriting the code to account for such changes.

SUMMARY

Various approaches are described herein for, among other things, dynamically injecting code into a running process. For instance, the approaches are capable of causing arbitrary code to be activated in the process while the process is running in response to receipt of a request for dynamic execution of the arbitrary code from outside the process while the process is running. The approaches may cause the arbitrary code to be activated in the process in any of a variety of ways, including but not limited to causing an operating system (OS) application programming interface (API) to look up a location of a code container that includes the arbitrary code from a registry, loading the arbitrary code from a code container via a path that is indicated by the message into a shared library at a location that is indicated by the message and calling the shared library to execute the arbitrary code value, obtaining the arbitrary code from a code container that is indicated by the message and activating the arbitrary code at an entry point of the process that is specified by the message, etc.

A method is described for dynamically injecting code into a running process. According to the method, a message is received in a targeted process from a requesting process that is external to the targeted process while the targeted process is running. The message requests dynamic execution of arbitrary code in the targeted process. The message includes a code identifier that identifies the arbitrary code. The arbitrary code is caused to be located and activated in the targeted process while the targeted process is running based on the code identifier to provide activated code.

A system is described that includes an interface module and a causation module. The interface module is configured to receive a message in a targeted process from a requesting process that is external to the targeted process while the targeted process is running. The message requests dynamic execution of arbitrary code in the targeted process. The message includes a code identifier that identifies the arbitrary code. The causation module is configured to cause the arbitrary code to be located and activated in the targeted process while the targeted process is running based on the code identifier to provide activated code.

A computer program product is described, that includes a computer-readable medium having computer program logic recorded thereon for enabling a processor-based system to dynamically inject code into a running process. The computer program product includes a program logic module. The program logic module is for enabling the processor-based system to cause arbitrary code to be located and activated in a targeted process while the targeted process is running to provide activated code based on receipt of a message in the targeted process from a requesting process that is external to the targeted process while the targeted process is running. The message requests dynamic execution of the arbitrary code in the targeted process. The message includes a code identifier that identifies the arbitrary code. The code identifier is useable to locate and activate the arbitrary code.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE
DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of dynamically injecting code into a running process. For instance, the example embodiments are capable of causing arbitrary code to be activated in the process while the process is running in response to receipt of a request for dynamic execution of the arbitrary code from outside the process while the process is running. The example embodiments may cause the arbitrary code to be activated in the process in any of a variety of ways, including but not limited to causing an operating system (OS) application programming interface (API) to look up a location of a code container that includes the arbitrary code from a registry, to activate the arbitrary code from the code container upon determining the location, and to provide a reference to the arbitrary code to a caller that provided the request; loading the arbitrary code from a code container via a path that is indicated by the message into a shared library at a location that is indicated by the message and calling the shared library to activate the arbitrary code value; obtaining the arbitrary code from a code container that is indicated by the message and activating the arbitrary code at an entry point of the process that is specified by the message, etc.

Example techniques described herein have a variety of benefits as compared to conventional techniques for executing code in a process. For instance, the example techniques may "attach" to a running target process on an ad hoc basis in order to bring code of a requesting process to bear against the target process. The example techniques may pass data that qualify instantiation of arbitrary code to enable parameterized activation of the arbitrary code. The instantiation may be qualified in any of a variety of arbitrary ways (e.g., by accessing data received from the requesting process). Once the arbitrary code is injected into the running targeted process, the arbitrary code may be serviced (e.g., updated) out-of-band with respect to the targeted process and/or an environment (e.g., a programming runtime environment) in which the targeted process runs (i.e., outside the targeted process and/or the aforementioned environment).

The example techniques may reduce cost and/or a number of steps to the user experience and/or the developer experience of activating the code, as compared to conventional techniques for executing code in a process. For example, the example techniques need not necessarily provide API functionality to code of the requesting process. In accordance with this example, production and maintenance of documentation, forward compatibility, etc. with regard to such API functionality may not be necessary. In further accordance with this example, servicing and/or versioning problems associated with such API functionality may be avoided. The arbitrary code that is injected into the running process may provide an API with which the caller that provided the request for dynamic execution of the arbitrary code may communicate. This may provide greater flexibility and/or control with respect to the process in which the arbitrary code is injected. In another example, no particular configuration is needed at startup of the targeted process. For instance, if the targeted process is not started with a configuration that references the code, the targeted process need not be restarted with a configuration that references the code. Accordingly, circumstances problems) that exist while the target process is running need not be recreated. In yet another example, a provider of the requesting process need not necessarily make adjustments to code of the requesting process in order to keep in sync with changes to the target process.

Figure 1:
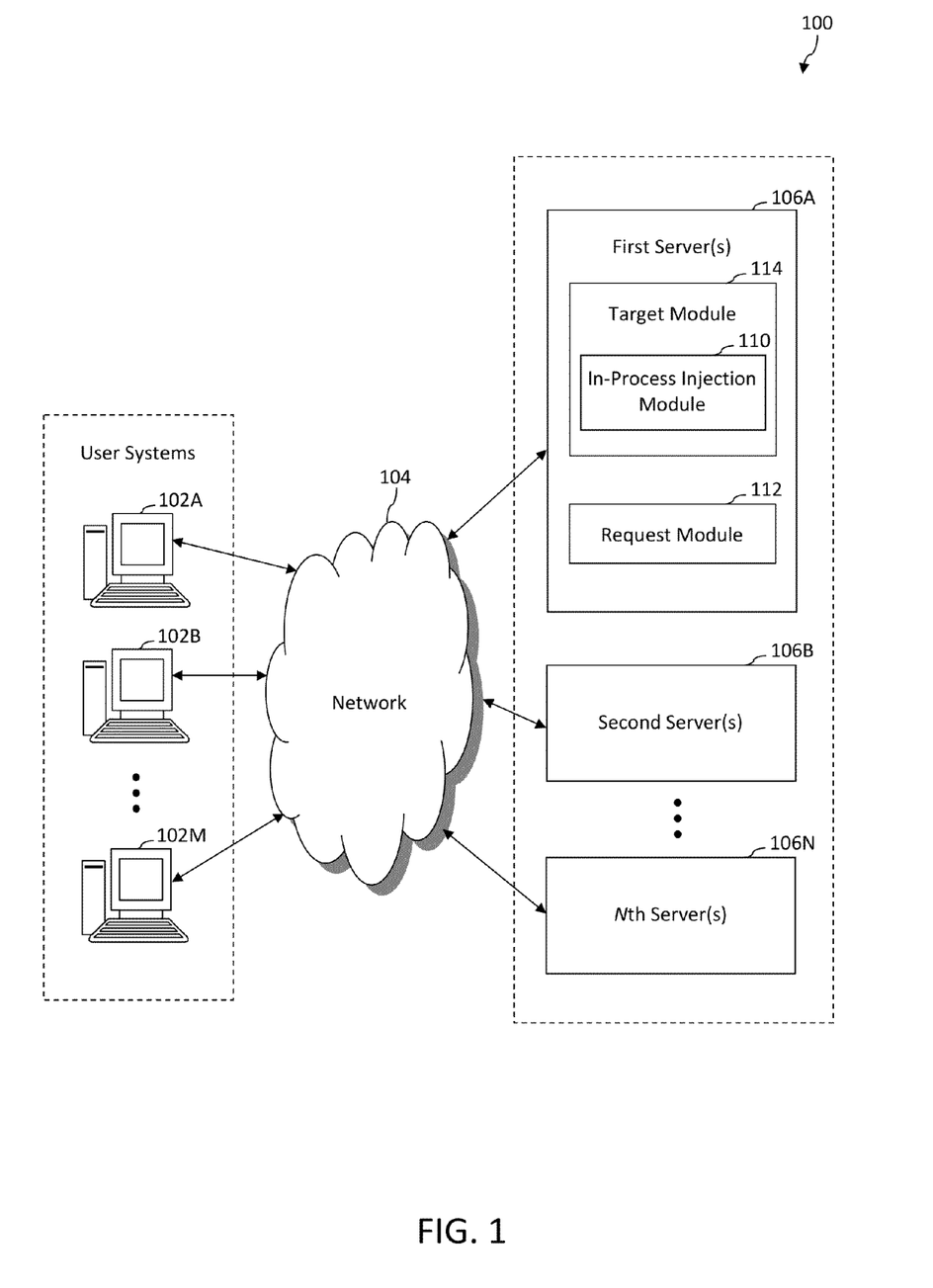
FIG. 1 is a block diagram of an example computer system in accordance with an embodiment.

FIG. 1 is a block diagram of an example computer system 100 in accordance with an embodiment. Generally speaking, computer system 100 operates to provide information to users (e.g., application developers) in response to requests (e.g., hypertext transfer protocol (HTTP) requests) that are received from the users. The information may include documents (e.g., Web pages, images, video files, etc.), output of executables, and/or any other suitable type of information. In accordance with example embodiments described herein, computer system 100 dynamically injects code into running process(es). For instance, if an application developer develops an application using computer system 100, computer system 100 may dynamically inject code into the application while the application is running in order to facilitate troubleshooting with regard to the application. Detail regarding techniques for dynamically injecting code into running process (es) is provided in the following discussion.

As shown in FIG. 1, computer system 100 includes a plurality of user systems 102A-102M, a network 104, and a plurality of servers 106A-106N. Communication among user systems 102A-102M and servers 106A-106N is carried out over network 104 using well-known network communication protocols. Network 104 may be a wide-area network (e.g., the Internet), a local area network (LAN), another type of network, or a combination thereof.

User systems 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant etc. User systems 102A-102M are configured to provide requests to servers 106A-106N for requesting information stored on (or otherwise accessible via) servers 106A-106N. For instance, a user may initiate a request for executing a computer program using a client (e.g., a Web browser, Web crawler, or other type of client) deployed on a user system 102 that is owned by or otherwise accessible to the user. In accordance with some example embodiments, user systems 102A-102M are capable of accessing domains Web sites) hosted by servers 104A-104N, so that user systems 102A-102M may access information that is available via the domains. Such domain may include Web pages, which may be provided as hypertext markup language (HTML) documents and objects (e.g., files) that are linked therein, for example.

It will be recognized that any one or more user systems 102A-102M may communicate with any one or more servers 106A-106N. Although user systems 102A-102M are depicted as desktop computers in FIG. 1, persons skilled in the relevant art(s) will appreciate that user systems 102A-102M may include any client-enabled system or device, including but not limited to a desktop computer, a laptop computer, a tablet computer, a personal digital assistant, a cellular telephone, or the like.

Servers 106A-106N are processing systems that are capable of communicating with user systems 102A-102M. Servers 106A-106N are configured to execute computer programs that provide information to users in response to receiving requests from the users. For example, the information may include documents (e.g., Web pages, images, video files, etc.), output of executables, or any other suitable type of information. In accordance with some example embodiments, servers 106A-106N are configured to host respective Web sites, so that the Web sites are accessible to users of computer system 100.

First server 106A is shown to include a request module 112 and a target module 114 for illustrative purposes. Request module 112 is configured to execute a requesting process (e.g., a requesting software program), which is external to a targeted process that is executed by target module 114. The requesting process is capable of generating message(s) that request dynamic execution of arbitrary code in the targeted process that is executed by target module 114. One example type of a requesting process is referred to as a tool process. A tool process is a requesting process that is capable of being used to perform diagnostic operations (e.g., identifying source of problem, debugging, profiling, controlling, etc.) with respect to a targeted process. Examples of a tool process include but are not limited to a web development program (e.g., Windows Azure Platform®, Amazon Web Services®, Google App Engine®, VMWare®, Force,com®, etc.) and an integrated development environment (e.g., Microsoft Visual Studio®, JDeveloper®, NetBeans®, Eclipse Platform™, etc.).

Target module 114 is configured to execute a targeted process (e.g., a targeted software application). Examples of a targeted process include but are not limited to a web browser (e.g., Internet Explorer®, Firefox®, Google Chronic®, Safari®, etc.), a game e.g., an online game or a console game), etc. In one example embodiment, the targeted process runs in a programming runtime environment. For instance, the programming runtime environment may be executed by a runtime module that includes target module 114. A programming runtime environment is a software component that supports execution of computer programs written in designated computer programming language(s) by translating intermediate language (IL) instructions into machine instructions. For instance, Java Runtime Environment® (JRE), developed and distributed by Sun Microsystems, Inc, (now Oracle America, Inc.), is an example of a programming runtime environment that supports execution of computer programs written in the Java® programming language. Common Language Runtime® (CLR), developed and distributed by Microsoft Corporation, is an example of a programming runtime environment that supports execution of computer programs written in a variety of languages. It will be recognized, however, that the targeted process need not necessarily run in a programming runtime environment.

Target module 114 includes an in-process injection module 110. In-process injection module 110 is configured to dynamically inject arbitrary code into the targeted process that is executed by target module 114 to satisfy request(s) therefor from requesting module 112. For example, in-process injection module 110 is capable of causing the arbitrary code to be located and activated in the targeted process while the targeted process is running, resulting in activated code. In accordance with this example, the arbitrary code is caused to be located and activated in the targeted process based on receipt of message(s) in the targeted process from the requesting process while the targeted process is running. The message(s) from the requesting process request dynamic execution of the arbitrary code in the targeted process. In further accordance with this example, the message(s) may include code identifier(s) that identify the respective arbitrary code and that may be useable to locate and activate the arbitrary code. The message(s) from the requesting process may be received by the targeted process directly from the requesting process or indirectly from the requesting process. For instance, one or more of the message(s) may be received via one or more intermediate processes and/or modules. Such intermediate processes and/or modules may forward the message(s) toward the targeted process upon receipt thereof from the requesting process or from another intermediate process, module, and/or machine. Some example techniques for dynamically injecting code into a running process are discussed in greater detail below with reference to FIGS. 2-10.

In-process injection module 110, request module 112, and target module 114 are shown to be incorporated in first server(s) 106A for illustrative purposes and are not intended to be limiting. It will be recognized that in-process injection module 110, request module 112, and/or target module 114 (or any portion(s) thereof) may be incorporated in any one or more of the user systems 102A-102M. For example, client-side aspects of in-process injection module 110, request module 112, and/or target module 114 may be incorporated in one or more of the user systems 102A-102M, and server-side aspects of in-process injection module 110, request module 112, and/or target module 114 may be incorporated in first server(s) 106A. In another example, in-process injection module 110, request module 112, and/or target module 114 may be distributed among the user systems 102A-102M, in yet another example, in-process injection module 110, request module 112, and/or target module 114 may be incorporated in a single one of the user systems 102A-102M. In still another example, in-process injection module 110, request module 112, and/or target module 114 (or any portion(s) thereof) may be incorporated in a device that is locally connected via a wired or wireless connection to a user system. For instance, target module 114 (including in-process injection module 110) may be incorporated in a mobile device that is coupled via a communication link to user system 102A, and request module 112 may be incorporated in user system 102A.

In-process injection module 110 may be implemented in various ways to dynamically inject code into a running process, including being implemented in hardware, software, firmware, or any combination thereof. For example, in-process injection module 110 may be implemented as computer program code configured to be executed in one or more processors. In another example, in-process injection module 110 may be implemented as hardware logic/electrical circuitry. In an embodiment, in-process injection module 110 may be implemented in a system-on-chip (SoC). Each SoC may include an integrated circuit chip that includes one or more of a processor (e.g., a microcontroller, microprocessor, digital signal processor (DSP), etc.), memory, one or more communication interfaces, and/or farther circuits and/or embedded firmware to perform its functions.

Following are two example scenarios in which computer system 100 may be used. In the first scenario, a customer may be using a requesting process that is executed by request module 112. The customer may select an "attach to running process on networked machine" entry in a "Debug" menu that is provided in the context of the requesting process. Request module 112 may retrieve a list of processes that are running on the networked machine. The user may select a targeted process from the list of processes and press an "Attach" button, for example. Request module 112 may package and send a message to the running targeted process to activate a debugging component in the running targeted process. In-process injection module 110 may perform a global registration operation with respect to the debugging component to enable request module 112 to have access (e.g., to attach) to the debugging component in response to receipt of the message from requesting module 112.

In the second scenario, request module 112 enumerates all processes running on a tablet that is attached to a local computer via a universal serial bus (USB) cable. In this scenario, no tool code has been downloaded to the tablet itself. Request module 112 selects a targeted process running on the tablet and packages an activation message to be sent to the tablet. The activation message includes a code location identifier that specifies a location of a code container. For instance, the code location identifier may specify a uniform resource locator (URL) corresponding to information that is viewable from the tablet. Upon receipt of the activation message, in-process injection module 110 retrieves the code container from the location specified by the code location identifier and activates arbitrary code that is included in the code container to provide instantiated code. In-process injection module 110 provides a pointer to the instantiated code to request module 112. It is noted that request module 112 may call directly into the instantiated code if the instantiated code is represented as a component object model (COM) object that supports marshalling. In-process injection module 110 may initialize the instantiated code with information regarding the instantiated code that may be useful for its execution environment.

The example scenarios mentioned above are provided for illustrative purposes and are not intended to be limiting. It will be recognized that the example techniques described herein are applicable to any of a variety of scenarios.

Figure 2:
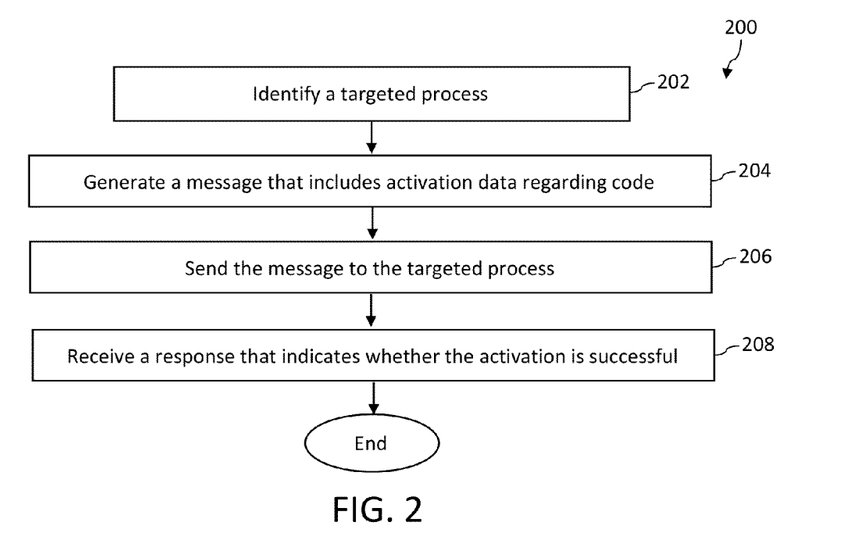
FIG. 2 depicts a flowchart of an example method for dynamically activating code of a targeted process according to an embodiment.
Figure 3:
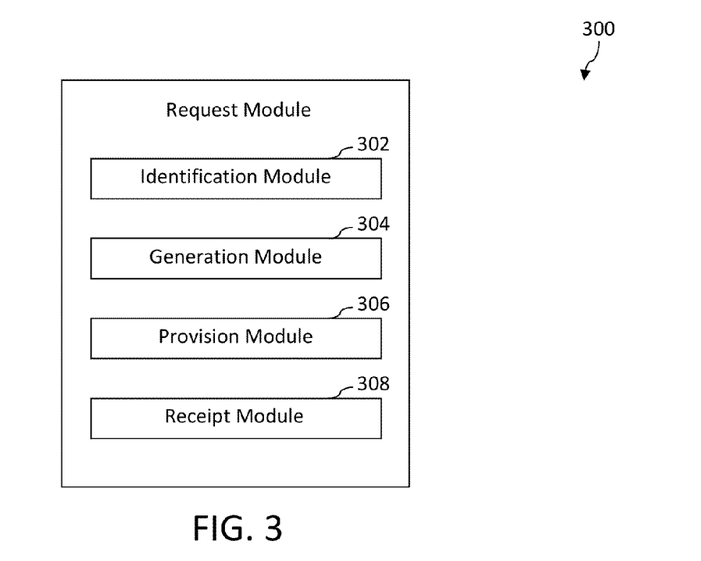
FIG. 3 is a block diagram of an example implementation of a request module shown in FIG. 1 in accordance with an embodiment.

FIG. 2 depicts a flowchart 200 of an example method for dynamically activating code of a targeted process according to an embodiment. Flowchart 200 may be performed by request module 112 of system 100 shown in FIG. 1, for example. For illustrative purposes, flowchart 200 is described with respect to request module 300 shown in FIG. 3, which is an example of request module 112, according to an embodiment. As shown in FIG. 3, request module 300 includes an identification module 302, a generation module 304, a provision module 306, and a receipt module 308. Further structural and operational embodiments will be apparent to persons skilled in the relevant art(s) based on the discussion regarding flowchart 200.

As shown in FIG. 2, the method of flowchart 200 begins at step 202. In step 202, a targeted process is identified. In an example implementation, identification module 302 identifies the targeted process.

At step 204, a message is generated that includes activation data regarding code. In an example implementation, generation module 304 generates the message.

At step 206, the message is sent to the targeted process. In an example implementation, provision module 306 sends the message to the targeted process.

At step 208, a response is received that indicates whether the activation is successful. For example, an error message may be received if the activation is not successful. In accordance with this example, the error message may specify an error that occurred with respect to activation of the code. In another example, a success message may be received if the activation is successful. In accordance with this example, the success message may indicate that the code is accessible to request module 300. For instance, the success message may include a reference to the code that is useable to call into the code. In an example implementation, receipt module 308 receives the response.

In some example embodiments, one or more steps 202, 204, 206, and/or 208 of flowchart 200 may not be performed. Moreover, steps in addition to or in lieu of steps 202, 204, 206, and/or 208 may be performed.

It will be recognized that request module 300 may not include one or more of identification module 302, generation module 304, provision module 306, and/or receipt module 308. Furthermore, request module 300 may include modules in addition to or in lieu of identification module 302, generation module 304, provision module 306, and/or receipt module 308.

Figure 4:
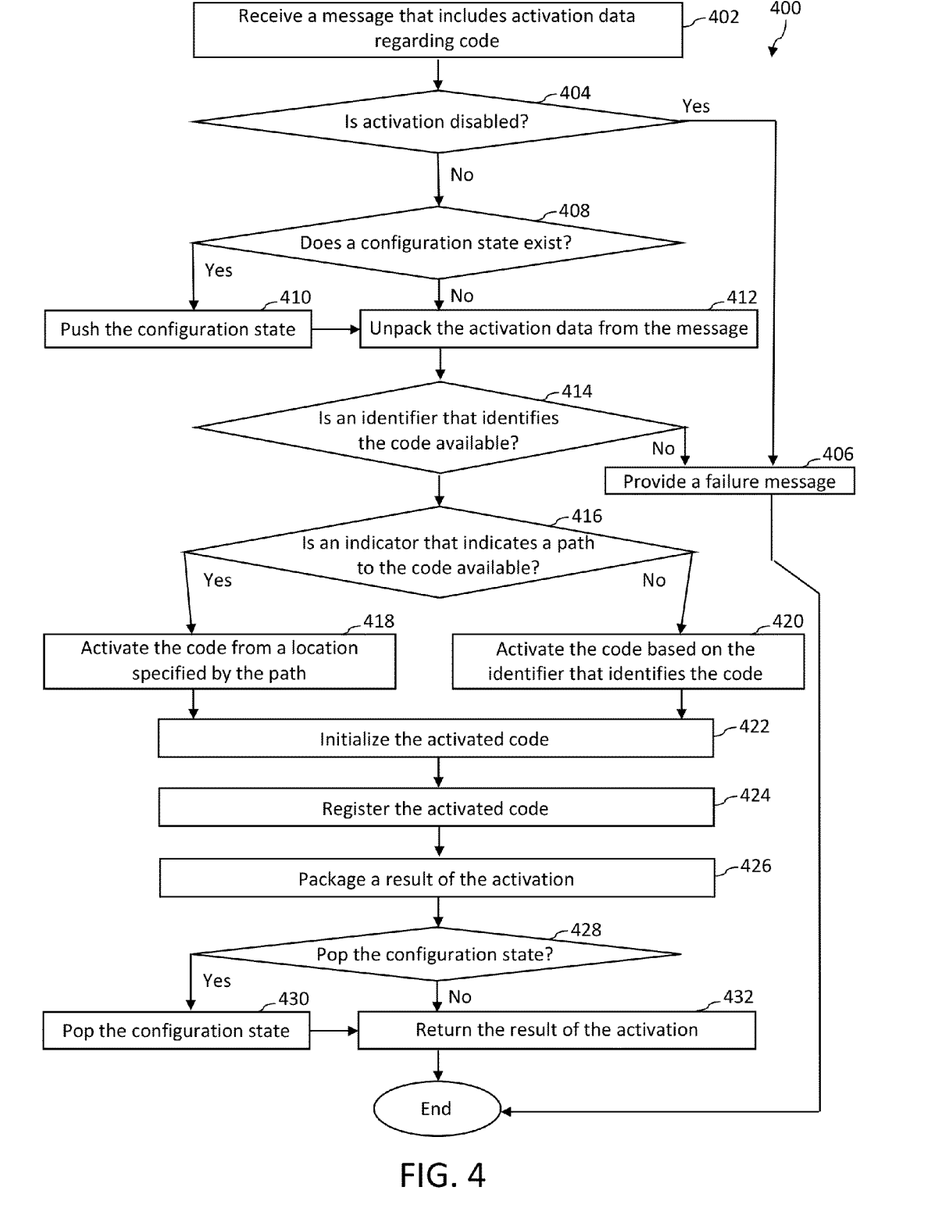
FIGS. 4 and 6 depict flowcharts of example methods for dynamically injecting code into a running process according to embodiments.
Figure 5:
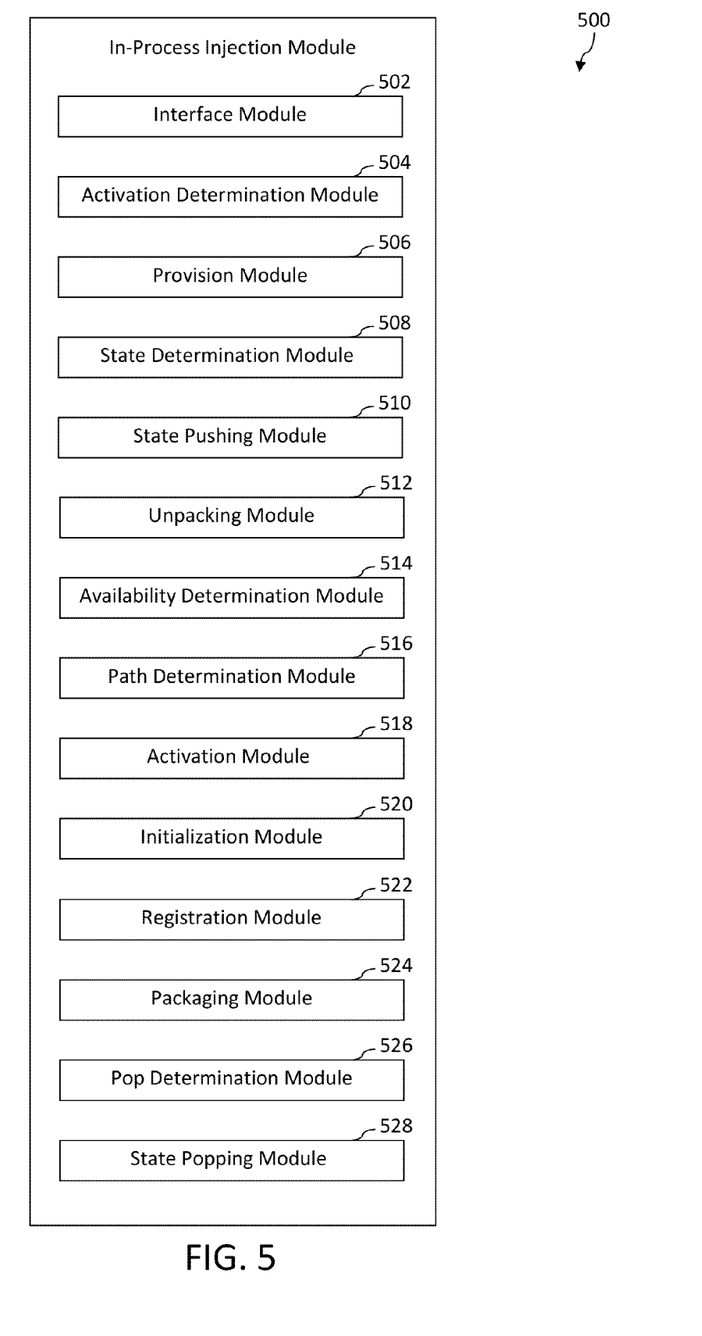
FIGS. 5 and 7 are block diagrams of example implementations of an in-process injection module shown in FIG. 1 in accordance with embodiments.

FIG. 4 depicts a flowchart 400 of an example method for dynamically injecting code into a running process according to an embodiment. Flowchart 400 may be performed by in-process injection module 110 of system 100 shown in FIG. 1, for example. For illustrative purposes, flowchart 400 is described with respect to in-process injection module 500 shown in FIG. 5, which is an example of in-process injection module 110, according to an embodiment. As shown in FIG. 5, in-process injection module 500 includes an interface module 502, an activation determination module 504, a provision module 506, a state determination module 508, a state pushing module 510, an unpacking module 512, an availability determination module 514, a path determination module 516, an activation module 518, an initialization module 520, a registration module 522, a packaging module 524, a pop determination module 526, and a state popping module 528. Further structural and operational embodiments will be apparent to persons skilled in the relevant art(s) based on the discussion regarding flowchart 400.

As shown in FIG. 4, the method of flowchart 400 begins at step 402. In step 402, a message is received that includes activation data regarding code. In an example implementation, interface module 502 receives the message.

At step 404, a determination is made whether activation is disabled. If activation is disabled, the code cannot be activated. If activation is not disabled, the code may be activated if appropriate activation operations are performed in accordance with technique(s) described herein. If activation is disabled, flow continues to step 406. Otherwise, flow continues to step 408. In an example implementation, activation determination module 504 determines whether activation is disabled. It is noted that, in some embodiments, activation may be toggled between "enabled" and "disabled" by an entity, such as a system administrator. In accordance with these embodiments, toggling the activation from "disabled" to "enabled" may render the code capable of being activated if the appropriate activation operations are performed in accordance with technique(s) described, herein.

At step 406, a failure message is provided. The failure message indicates that activation is disabled. In an example implementation, provision module 506 provides the failure message. Upon completion of step 406, flowchart 400 ends.

At step 408, a determination is made whether a configuration state exists. For example, the configuration state may be specified by environment variable(s) that are associated with the code. In accordance with this example, if such environment variable(s) specify the configuration state, the configuration state is said to exist. If no such environment variable(s) exist or such environment variable(s) do not specify the configuration state, the configuration state is said to not exist. If a configuration state exists, flow continues to step 410. Otherwise, flow continues to step 412. In an example implementation, state determination module 508 determines whether a configuration state exists.

At step 410, the configuration state is pushed. "Pushing" the configuration state means "persisting" the configuration state to be restored at a future time. For instance, pushing the configuration state may result in a coding convenience, such as enabling reuse of the same code location and/or activation mechanism that is provided on startup of the code. In an example implementation, state pushing module 510 pushes the configuration state. Upon completion of step 410, flow continues to step 412.

At step 412, the activation data is unpacked from the message. In an example implementation, unpacking module 512 unpacks the activation data from the message.

At step 414, a determination is made whether an identifier that identifies the code is available. If an identifier that identifies the code is available, flow continues to step 416. Otherwise, flow continues to step 406. In an example implementation, availability determination module 514 determines whether an identifier that identifies the code is available.

At step 416, a determination is made whether an indicator that indicates a path to the code is available. For example, the path may be a network location, information regarding a local machine, a uniform resource identifier (URI) to a file that may be downloaded via a network (e.g., the Internet), etc. In accordance with this example, the URI may be a uniform resource locator (URL) or a uniform resource name (URN). If an indicator that indicates a path to the code is available, flow continues to step 418. Otherwise, flow continues to step 420. In an example implementation, path determination module 516 determines whether an indicator that indicates a path to the code is available.

At step 418, the code is activated (e.g., loaded and/or at least partially executed) from a location specified by the path. In an example implementation, activation module 518 activates the code from the location specified by the path. Upon completion of step 418, flow continues to step 422.

At step 420, the code is activated based on the identifier that identifies the code. In an example implementation, activation module 518 activates the code based on the identifier that identifies the code. Upon completion of step 420, flow continues to step 422.

It will be recognized that an unsuccessful attempt to perform step 418, 420, and/or 422 may lead to an error condition, in which case flow continues to step 406. For example, activation of the code may fail at step 418 or 420. In another example, initialization of the activated code may fail at step 422. In accordance with this example, the activated code may be "cleaned up" if the initialization fails.

At step 422, the activated code is initialized. For instance, initialization may involve reviewing environmental variables for information to qualify activation of the code, requiring the activated code to implement a specified interface, requiring a code container that is associated with the activated code to expose entry points of names that may be called, unpacking arbitrary initialization data from the message, etc. In an example implementation, initialization module 520 initializes the activated code.

At step 424, the activated code is registered. In an example implementation, registration module 522 registers the activated code.

At step 426, a result of the activation is packaged. In an example implementation, packaging module 524 packages the result of the activation.

At step 428, a determination is made whether the configuration state is to be popped. If the configuration state is to be popped, flow continues to step 430. Otherwise, flow continues to step 432. In an example implementation, pop determination module 526 determines whether the configuration state is to be popped.

At step 430, the configuration state is popped. "Popping" the configuration state means "restoring" the configuration state, which is pushed at step 410, In an example implementation, state popping module 528 pops the configuration state. Upon completion of step 430, flow continues to step 432.

At step 432, the result of the activation is returned. In an example implementation, provision module 506 returns the result of the activation. Upon completion of step 432, flowchart 400 ends.

In some example embodiments, one or more steps 402, 404, 406, 408, 410, 412, 414, 416, 418, 420, 422, 424, 426, 428, 430, and/or 432 of flowchart 400 may not be performed. Moreover, steps in addition to or in lieu of steps 402, 404, 406, 408, 410, 412, 414, 416, 418, 420, 422, 424, 426, 428, 430, and/or 432 may be performed.

It will be recognized that in-process injection module 500 may not include one or more of interface module 502, activation determination module 504, provision module 506, state determination module 508, state pushing module 510, unpacking module 512, availability determination module 514, path determination module 516, activation module 518, initialization module 520, registration module 522, packaging module 524, pop determination module 526, and/or state popping module 528. Furthermore, in-process injection module 500 may include modules in addition to or in lieu of interface module 502, activation determination module 504, provision module 506, state determination module 508, state pushing module 510, unpacking module 512, availability determination module 514, path determination module 516, activation module 518, initialization module 520, registration module 522, packaging module 524, pop determination module 526, and/or state popping module 528.

Figure 6:
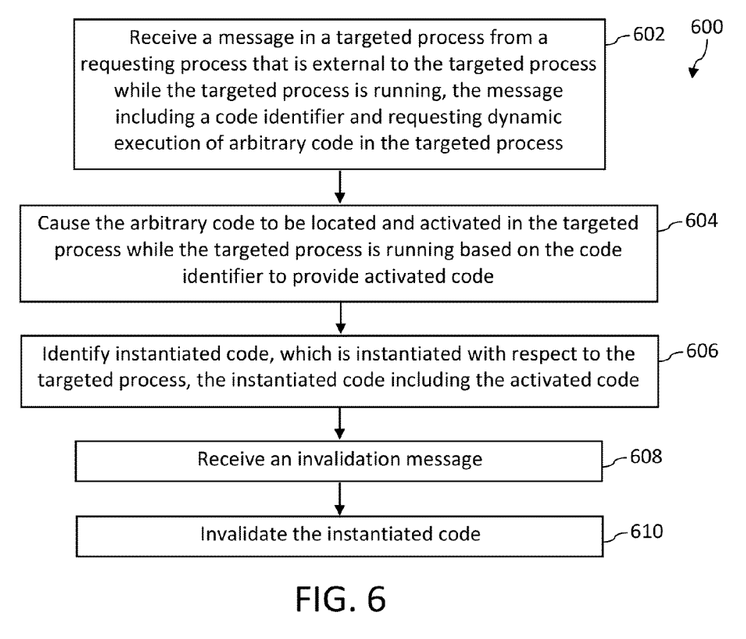
Figure 7:
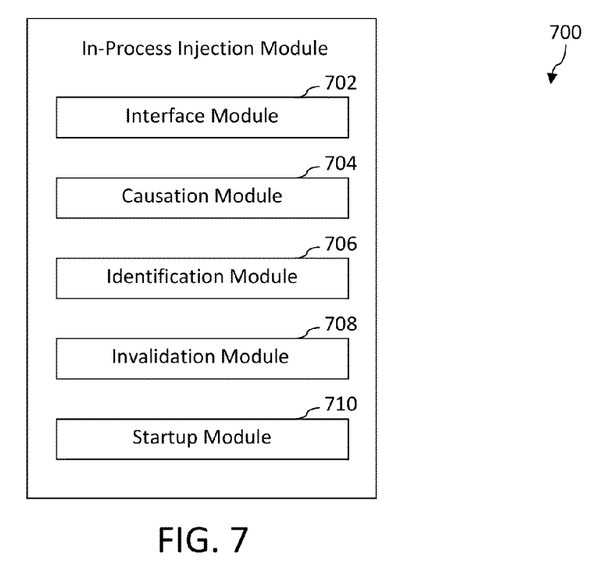

FIG. 6 depicts a flowchart 600 of another example method for dynamically injecting code into a running process according to an embodiment. Flowchart 600 may be performed by in-process injection module 110 of system 100 shown in FIG. 1, for example. For illustrative purposes, flowchart 600 is described with respect to in-process injection module 700 shown in FIG. 7, which is another example of in-process injection module 110, according to an embodiment. As shown in FIG. 7, in-process injection module 700 includes an interface module 702, a causation module 704, an identification module 706, an invalidation module 708, and a startup module 710. Further structural and operational embodiments will be apparent to persons skilled in the relevant art(s) based on the discussion regarding flowchart 600.

As shown in FIG. 6, the method of flowchart 600 begins at step 602. In step 602, a message is received in a targeted process from a requesting process that is external to the targeted process while the targeted process is running. It will be recognized that the message may be received in the targeted process directly or indirectly from the requesting process. The message includes a code identifier and requests dynamic execution of arbitrary code in the targeted process. The code identifier identifies the arbitrary code. The code identifier is useable to locate and activate the arbitrary code. The requesting process may be a tool process, such as a web development program or an integrated development environment, though the scope of the example embodiments is not limited in this respect. In an example implementation, interface module 702 receives the message in the targeted process from the requesting process while the targeted process is running.

In an example embodiment, the code identifier contains source code to be compiled and then executed in the targeted process. In another example embodiment, the code identifier is a URI and/or a web service call that returns source code for compilation. In yet another example embodiment, the code identifier contains script code, which is not compiled, for execution in the targeted process.

At step 604, the arbitrary code is caused to be located and activated (e.g., loaded and/or at least partially activated) in the targeted process while the targeted process is running based on the code identifier to provide activated code. In an example implementation, causation module 704 causes the arbitrary code to be located and activated in the targeted process while the targeted process is running.

In an example embodiment, step 604 includes causing an operating system (OS) application programming interface (API) to look up a location of a code container that includes the arbitrary code from a registry based on the code identifier. For instance, the operating system application programming interface may be caused to use the code identifier as a key to look up the location of the code container. The code identifier may be represented using a globally unique identifier (GUM), for example. The operating system application programming interface may be a CoCreateInstance component object model (COM) function, for example. It will be recognized that the code container may be a binary container or a cab or other compressed container front which the code is to be extracted. In accordance with this embodiment, the code identifier is provided to the operating system application programming interface.

In another example embodiment, step 604 includes providing arbitrary data to the arbitrary code to initialize the arbitrary code. In accordance with this embodiment, the arbitrary data is included in the message that is received in the targeted process at step 602.

In yet another example embodiment, step 604 includes halting all threads of the targeted process except for a thread that is associated with the activated code.

In still another example embodiment, the code identifier and/or other data in the message specifies a singleton instance of the arbitrary code. For instance, the code identifier and/or other data may request that an instance of the arbitrary code be created if such an instance does not already exist and/or that a previously constructed instance of the arbitrary code be returned otherwise. An object registration mechanism may be reused for this purpose.

At step 606, instantiated code, which is instantiated with respect to the targeted process, is identified. The instantiated code includes the activated code. In an example implementation, identification module 706 identifies the instantiated code, which is instantiated with respect to the targeted process.

At step 608, an invalidation message is received. For instance, the invalidation message may be generated by the targeted process or by the requesting process. In an aspect, the invalidation message may indicate that an error has occurred in the targeted process or in the requesting process. In another aspect, the invalidation message may indicate that the targeted process or the requesting process is to be discontinued. For example, the invalidation message may be received in response to a user exiting the targeted process. In accordance with this example, the invalidation message may be received during a shutdown sequence of the targeted process. For instance, the targeted process may detect that the user has exited the targeted process and generate the invalidation message based thereon. In an example implementation, interface module 702 receives the invalidation message.

At step 610, the instantiated code is invalidated. For example, the instantiated code may be discarded, removed from memory, called into so that the instantiated code may perform its own un-initialization and/or shutdown work, etc. In accordance with this example, reference(s) to the instantiated code may be deleted, deactivated, etc. In an example implementation, invalidation module 708 invalidates the instantiated code.

In an example embodiment, the message may include qualifier(s) related to caching of the arbitrary code. For example, the message may indicate that the arbitrary code is to be retrieved, even if the arbitrary code has already been retrieved and cached locally. In accordance with this example, the code identifier may refer to a URI, such as a URL or a URN. In one aspect, causation module 704 may consult a table that indicates whether that arbitrary code has been retrieved and cached locally already. Causation module 704 may retrieve the arbitrary code from the table if the arbitrary code has not been retrieved and cached locally already. In another aspect, causation module 704 may know whether causation module 704 has already compiled a code container that was delivered as source code in a previous message. Note that a message may include a GUM to be associated with the arbitrary code along with the source code for the arbitrary code to be identified by the GUID.

Because of the costs of transmitting source code with each message, the requesting process may request activation of a designated GUID. Activation may fail because the code container cannot be located, The requesting process may followup with a message that requests activating the same GUID and, this time, bundles the source code with the message. The causation module 704 may compile and cache and activate the arbitrary code. The requesting process may continue with another message that requests the arbitrary code, providing the GUID without the source code. This time, causation module 704 may locate and activate its cached compiled version of the arbitrary code. One potential reason for implementing the aforementioned scheme is that multiple requesting processes may be providing messages that request dynamic execution of the same arbitrary code in the targeted process.

It will be recognized that the message received by the targeted process may include a request for instantiating (e.g., initializing) more than a single code object, which may be included in a single code container or span multiple code containers. In the case where a return reference is provided, the data structure holding the result may contain an ordered collection of references to the various instantiated objects.

In some example embodiments, one or more steps 602, 604, 606, 608, and/or 610 of flowchart 600 may not be performed. Moreover, steps in addition to or in lieu of steps 602, 604, 606, 608, and/or 610 may be performed, For instance, in an example embodiment, flowchart 600 includes providing accessibility of code that is included in the targeted process to the activated code. Accessibility of the code that is included in the targeted process may be provided to the activated code despite some of the code that is included in the targeted process being configured to be inaccessible to entities other than the targeted process, for example. In accordance with this embodiment, causation module 704 may provide accessibility of the code that is included in the targeted process to the activated code.

In another example embodiment, flowchart 600 includes determining environmental variables that are associated with the arbitrary code. The environmental variables are configured to parameterize loading of the arbitrary code. For instance, startup module 710 may determine the environmental variables that are associated with the arbitrary code. In accordance with this embodiment, the arbitrary code is activated during startup of the targeted process in accordance with the environmental variables. For instance, startup module 710 may activate the arbitrary code during startup of the targeted process. In further accordance with this embodiment, step 604 is performed in response to completion of activating the arbitrary code during the startup of the targeted process. For instance, causation module 704 may perform step 604 in response to completion of activating the arbitrary code during startup of the targeted process.

In yet another example embodiment, flowchart 600 includes providing a value that references the activated code. The value is callable by the requesting process to interact with the targeted process while the targeted process continues to run. A data structure provided by the requesting process may be populated with the value, though the scope of the example embodiments is not limited in this respect. In one example, causation module 704 may provide the value that references the activated code. In accordance with this example, causation module 704 may generate the value.

In one aspect of the aforementioned embodiment, the requesting process may have a synchronous code activation experience that, on return, gives the requesting process access (e.g., relatively immediate access) to the value, which serves as a callable reference to the activated code. In another aspect, the activated code may be registered in a manner that causes the activated code to become accessible to the requesting process. For instance, the activated code may be registered using a memory section that is shared among the targeted process and the requesting process.

It will be recognized that in-process injection module 700 may not include one or more of interface module 702, causation module 704, identification module 706, invalidation module 708, and/or startup module 710. Furthermore, in-process injection module 700 may include modules in addition to or in lieu of interface module 702, causation module 704, identification module 706, invalidation module 708, and/or startup module 710.

Figure 8:
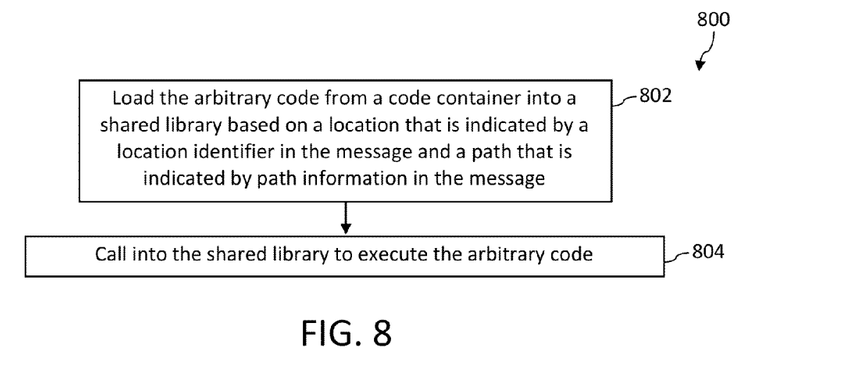
FIGS. 8 and 9 depict flowcharts of example methods for causing arbitrary code to be located and activated according to embodiments.
Figure 9:
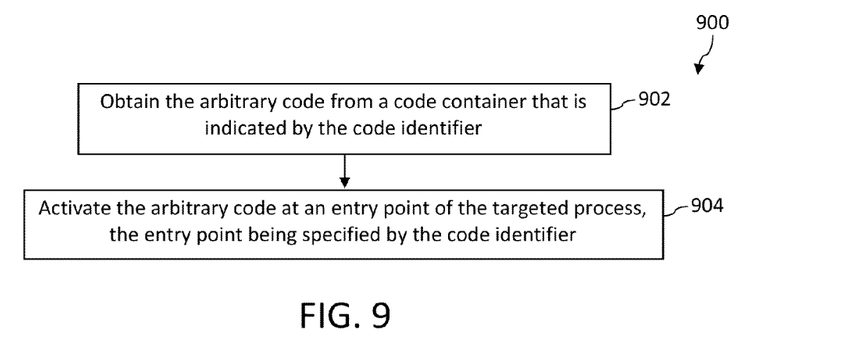
Figure 10:
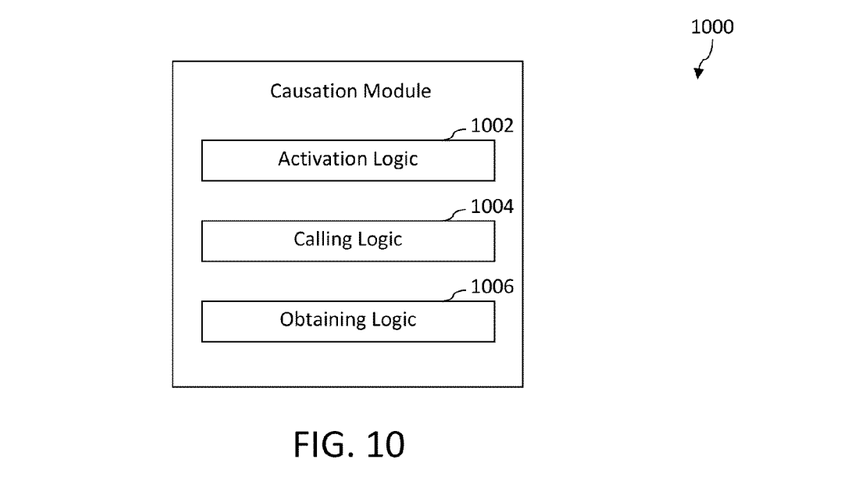
FIG. 10 is a block diagram of an example implementation of a causation module shown in FIG. 7 in accordance with an embodiment.

FIGS. 8 and 9 depict flowcharts 800 and 900 of example methods for causing arbitrary code to be located and activated according to embodiments. Accordingly, flowcharts 800 and 900 illustrate example ways in which step 604 of flowchart 600 may be performed. Flowcharts 800 and 900 may be performed by causation module 704 of in-process injection module 700 shown in FIG. 7, for example. For illustrative purposes, flowcharts 800 and 900 are described with respect to causation module 1000 shown in FIG. 10, which is an example of causation module 704, according to an embodiment. As shown in FIG. 10, causation module 1000 includes activation logic 1002, calling logic 1001, and obtaining logic 1006. Further structural and operational embodiments will be apparent to persons skilled, in the relevant art(s) based on the discussion regarding flowcharts 800 and 900.

As shown in FIG. 8, the method of flowchart 800 begins at step 802. In step 802, the arbitrary code is loaded from a code container into a shared library based on a location that is indicated by a location identifier in the message and a path that is indicated by path information in the message. For example, the shared library may be a dynamic-link library (DLL). In another example, the location identifier may be a uniform resource identifier (URI), such as a uniform resource locator (URL) or a uniform resource name (URN). In an example implementation, activation logic 1002 loads the arbitrary code from the code container into the shared library. For instance, activation logic 1002 may download the shared library from a source external to a device that includes causation module 1000.

At step 804, a call is made into the shared library to execute the arbitrary code. In an example implementation, calling logic 1004 calls into the shared library to execute the arbitrary code.

In some example embodiments, one or more steps 802 and/or 804 of flowchart 800 may not be performed. Moreover, steps in addition to or in lieu of steps 802 and/or 804 may be performed.

As shown in FIG. 9, the method of flowchart 900 begins at step 902. In step 902, the arbitrary code is obtained from a code container that is indicated by the code identifier. The code identifier may be specified as MyDll.dll#MyCodeActivatingEntryPoint, for example. In an example implementation, obtaining logic 1006 obtains the arbitrary code from the code container.

At step 904, the arbitrary code is activated at an entry point of the targeted process. The entry point is specified by the code identifier. For example, the code identifier may include a DLL that is to be loaded into memory, the entry point into which calls are to be made for accessing the arbitrary code, and a contract name that identifies an interface that is to be used for calling into the arbitrary code. In accordance with this example, the DLL exposes the entry point. The entry point may be specified by an identifier such as MyDll.dll#MyCode.ActivatingEntryPoint, for example. In this example, the initial portion, "MyDll", of the identifier represents a filename for illustrative purposes and is not intended to be limiting. It will be recognized that the initial portion of the identifier may be a fully-qualified path to a binary on disk or another URI that corresponds to a location of the arbitrary code. In an example implementation, activation logic 1002 activates the arbitrary code at the entry point of the targeted process that is specified by the code identifier.

In some example embodiments, one or more steps 902 and/or 904 of flowchart 900 may not be performed. Moreover, steps in addition to or in lieu of steps 902 and/or 904 may be performed.

It will be recognized that causation module 1000 may not include one or more of activation logic 1002, calling logic 1004, and/or obtaining logic 1006. Furthermore, causation module 1000 may include modules in addition to or in lieu of activation logic 1002, calling logic 1004, and/or obtaining logic 1006.

In-process injection module 110, request module 112, target module 114, identification module 302, generation module 304, provision module 306, receipt module 308, interface module 502, activation determination module 504, provision module 506, state determination module 508, state pushing module 510, unpacking module 512, availability determination module 514, path determination module 516, activation module 518, initialization module 520, registration module 522, packaging module 524, pop determination module 526, state popping module 528, interface module 702, causation module 704, identification module 706, invalidation module 708, startup module 710, activation logic 1002, calling logic 1004, obtaining logic 1006, flowchart 200, flowchart 400, flowchart 600, flowchart 800, and flowchart 900 may be implemented in hardware, software, firmware, or any combination thereof.

For example, in-process injection module 110, request module 112, target module 114, identification module 302, generation module 304, provision module 306, receipt module 308, interface module 502, activation determination module 504, provision module 506, state determination module 508, state pushing module 510, unpacking module 512, availability determination module 514, path determination module 516, activation module 518, initialization module 520, registration module 522, packaging module 524, pop determination module 526, state popping module 528, interface module 702, causation module 704, identification module 706, invalidation module 708, startup module 710, activation logic 1002, calling logic 1004, obtaining logic 1006, flowchart 200, flowchart 400, flowchart 600, flowchart 800, and/or flowchart 900 may be implemented as computer program code configured to be executed in one or more processors.

In another example, in-process injection module 110, request module 112, target module 114, identification module 302, generation module 304, provision module 306, receipt module 308, interface module 502, activation determination module 504, provision module 506, state determination module 508, state pushing module 510, unpacking module 512, availability determination module 514, path determination module 516, activation module 518, initialization module 520, registration module 522, packaging module 524, pop determination module 526, state popping module 528, interface module 702, causation module 704, identification module 706, invalidation module 708, startup module 710, activation logic 1002, calling logic 1004, obtaining logic 1006, flowchart 200, flowchart 400, flowchart 600, flowchart 800, and/or flowchart 900 may be implemented as hardware logic/electrical circuitry.

For instance, in an embodiment, one or more of in-process injection module 110, request module 112, target module 114, identification module 302, generation module 304, provision module 306, receipt module 308, interface module 502, activation determination module 504, provision module 506, state determination module 508, state pushing module 510, unpacking module 512, availability determination module 514, path determination module 516, activation module 518, initialization module 520, registration module 522, packaging module 524, pop determination module 526, state popping module 528, interface module 702, causation module 704, identification module 706, invalidation module 708, startup module 710, activation logic 1002, calling logic 1004, obtaining logic 1006, flowchart 200, flowchart 400, flowchart 600, flowchart 800, and/or flowchart 900 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 11:
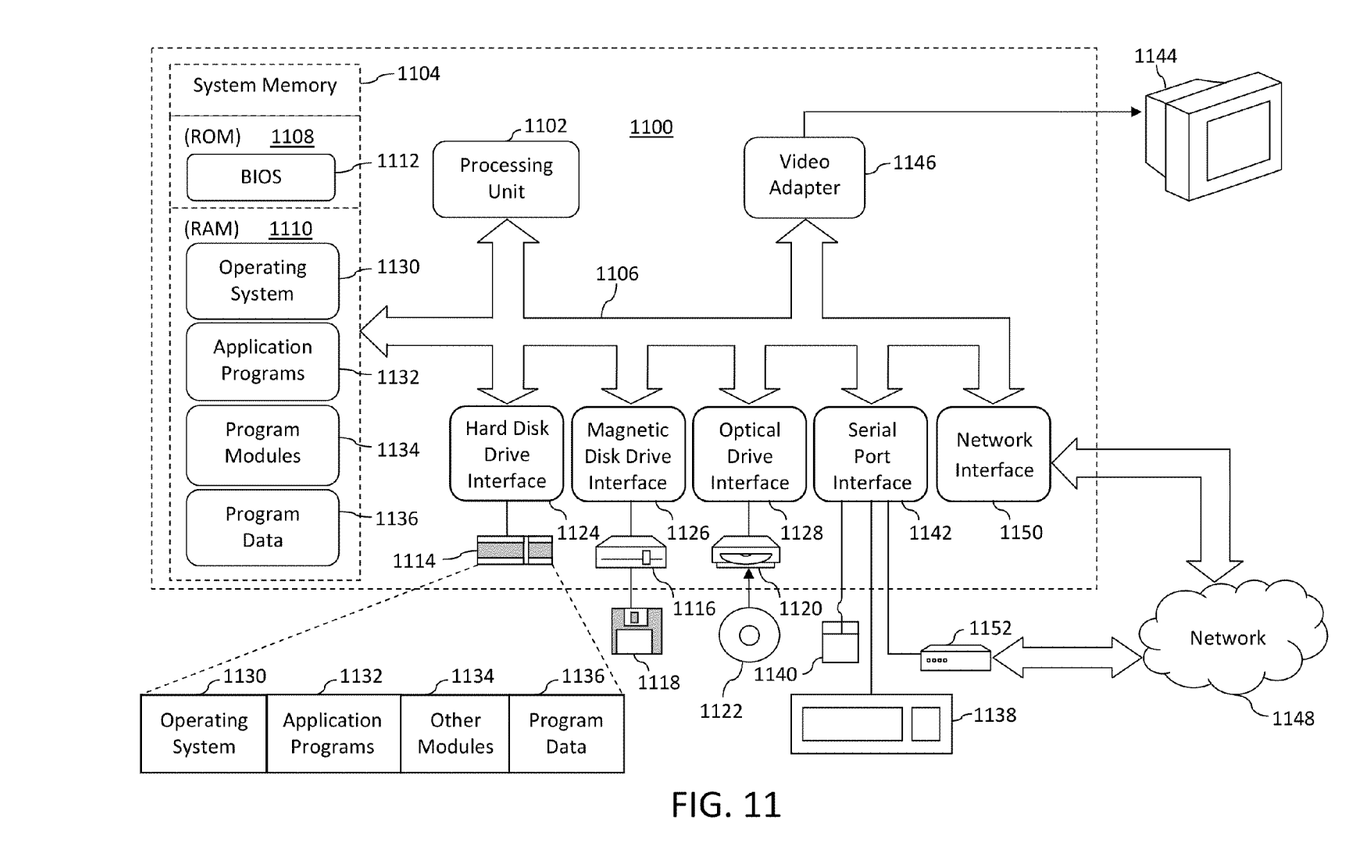
FIG. 11 depicts an example computer in which embodiments may be implemented.

FIG. 11 depicts an example computer 1100 in which embodiments may be implemented. Any one or more of the clients 102A-102M or any one or more of servers 106A-106N shown in FIG. 1 (or any one or more subcomponents thereof shown in FIGS. 1, 3, 5, 7, and 10) may be implemented using computer 1100, including one or more features of computer 1100 and/or alternative features. Computer 1100 may be a general-purpose computing device in the form of a conventional personal computer, a mobile computer, or a workstation, for example, or computer 1100 may be a special purpose computing device. The description of computer 1100 provided herein is provided for purposes of illustration, and is not intended to be limiting. Embodiments may be implemented in further types of computer systems, as would be known to persons skilled, in the relevant art(s).

As shown in FIG. 11, computer 1100 includes a processing unit 1102, a system memory 1104, and a bus 1106 that couples various system components including system memory 1104 to processing unit 1102. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computer 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk interface 1126, and an optical drive interface 1128, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1130, one or more application programs 1132, other program modules 1134, and program data 1136, Application programs 1132 or program modules 1134 may include, for example, computer program logic for implementing in-process injection module 110, request module 112, target module 114, identification module 302, generation module 304, provision module 306, receipt module 308, interface module 502, activation determination module 504, provision module 506, state determination module 508, state pushing module 510, unpacking module 512, availability determination module 514, path determination module 516, activation module 518, initialization module 520, registration module 522, packaging module 524, pop determination module 526, state popping module 528, interface module 702, causation module 704, identification module 706, invalidation module 708, startup module 710, activation logic 1002, calling logic 1004, obtaining logic 1006, flowchart 200 (including any step of flowchart 200), flowchart 400 (including any step of flowchart 400), flowchart 600 (including any step of flowchart 600), flowchart 800 (including any step of flowchart 800), and/or flowchart 900 (including any step of flowchart 900), as described herein.

A user may enter commands and information into the computer 1100 through input devices such as keyboard 1138 and pointing device 1140. Other input devices (not shown) may include a microphone, joystick, game pad, satellite dish, scanner, touch screen, camera, accelerometer, gyroscope, or the like. These and other input devices are often connected to the processing unit 1102 through a serial port interface 1142 that is coupled to bus 1106, but may be connected by other interfaces, such as a parallel port, game port, or a universal serial bus (USB).

A display device 1144 (e.g., a monitor) is also connected to bus 1106 via an interface, such as a video adapter 1146. In addition to display device 1144, computer 1100 may include other peripheral output devices (not shown) such as speakers and printers.

Computer 1100 is connected to a network 1148 (e.g., the Internet) through a network interface or adapter 1150, a modem 1152, or other means for establishing communications over the network. Modem 1152, which may be internal or external, is connected to bus 1106 via serial port interface 1142.

As used herein, the terms "computer program medium" and "computer-readable medium" are used to generally refer to non-transitory media such as the hard disk associated with hard disk drive 1114, removable magnetic disk 1118, removable optical disk 1122, as well as other non-transitory media such as flash memory cards, digital video disks, random access memories (RAMs), read only memories (ROM), and the like. Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 1132 and other program modules 1134) may be stored on the hard disk, magnetic disk, optical disk. ROM, or RAM. Such computer programs may also be received via network interface 1150 or serial port interface 1142. Such computer programs, when executed or loaded by an application, enable computer 1100 to implement features of embodiments discussed herein. Accordingly, such computer programs represent controllers of the computer 1100.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A method comprising:
  receiving a message in a targeted process from a requesting process that is external to the targeted process while the targeted process is running, the message requesting dynamic execution of arbitrary code in the targeted process, the message including a code identifier that identifies the arbitrary code, the code identifier being useable to locate and activate the arbitrary code; and
  causing, using at least one processor, the arbitrary code to be located and activated in the targeted process while the targeted process is running based on the code identifier to provide activated code.

2. The method of claim 1, wherein causing the arbitrary code to be located and activated comprises:
  causing an operating system application programming interface to look up a location of a code container that includes the arbitrary code from a registry based on the code identifier; and
  wherein causing the operating system application programming interface to look up the code container comprises:

providing the code identifier to the operating system application programming interface.

3. The method of claim 1, wherein receiving the message comprises:
receiving path information and a location identifier, the path information indicating a path to a code container, the location identifier indicating a location of a shared library; and
wherein causing the arbitrary code to be located and activated comprises:
loading the arbitrary code from the code container into the shared library based on the location that is indicated by the location identifier and further based on the path that is indicated by the path information; and
calling into the shared library to execute the arbitrary code.

4. The method of claim 1, wherein causing the arbitrary code to be located and activated comprises:
obtaining the arbitrary code from a code container that is indicated by the code identifier; and
activating the arbitrary code at an entry point of the targeted process, the entry point being specified by the code identifier.

5. The method of claim 1, wherein receiving the message comprises:
receiving arbitrary data that is included in the message; and
wherein causing the arbitrary code to be located and activated comprises:
providing the arbitrary data to the arbitrary code to initialize the arbitrary code.

6. The method of claim 1, further comprising:
providing accessibility of code that is included in the targeted process to the activated code.

7. The method of claim 1, further comprising:
identifying instantiated code, which is instantiated with respect to the targeted process, the instantiated code including the activated code;
receiving an invalidation message; and
invalidating the instantiated code in response to receiving the invalidation message.

8. The method of claim 1, wherein the code identifier contains source code to be compiled and then executed in the targeted process.

9. The method of claim 1, further comprising:
providing a value that references the activated code, the value being callable by the requesting process to interact with the targeted process while the targeted process continues to run.

10. The method of claim 1, wherein causing the arbitrary code to be located and activated in the targeted process while the targeted process is running comprises:
halting all threads of the targeted process except for a thread that is associated with the activated code.

11. A system comprising:
an interface module configured to receive a message in a targeted process from a requesting process that is external to the targeted process while the targeted process is running, the message requesting dynamic execution of arbitrary code in the targeted process, the message including a code identifier that identifies the arbitrary code, the code identifier being useable to locate and activate the arbitrary code; and
a causation module, implemented using at least one processor, configured to cause the arbitrary code to be located and activated in the targeted process while the targeted process is running based on the code identifier to provide activated code.

12. The system of claim 11, wherein the causation module is configured to cause an operating system application programming interface to look up a location of a code container that includes the arbitrary code from a registry based on the code identifier.

13. The system of claim 11, wherein the message includes path information and a location identifier, the path information indicating a path to a code container, the location identifier indicating a location of a shared library; and
wherein the causation module comprises:
activation logic configured to load the arbitrary code from the code container into the shared library based on the location that is indicated by the location identifier and further based on the path that is indicated by the path information; and
calling logic configured to call into the shared library to execute the arbitrary code.

14. The system of claim 11, wherein the causation module comprises:
obtaining logic configured to obtain the arbitrary code from a code container that is indicated by the code identifier; and
activation logic configured to activate the arbitrary code at an entry point of the targeted process, the entry point being specified by the code identifier.

15. The system of claim 11, wherein the message includes arbitrary data; and
wherein the causation module is configured to provide the arbitrary data to the arbitrary code to initialize the arbitrary code.

16. The system of claim 11, further comprising:
an identification module configured to identify instantiated code, which is instantiated with respect to the targeted process, the instantiated code including the activated code; and
an invalidation module configured to invalidate the instantiated code in response to receipt of an invalidation message.

17. The system of claim 11, wherein the causation module is configured to provide a value that references the activated code, the value being callable by the requesting process to interact with the targeted process while the targeted process continues to run.

18. The system of claim 11, wherein the causation module is configured to halt all threads of the targeted process except for a thread that is associated with the activated code during loading of the arbitrary code in the targeted process.

19. A computer program product comprising a computer-readable medium having computer program logic recorded thereon for enabling a processor-based system to dynamically inject code into a running process, the computer program product comprising:
a first program logic module for enabling the processor-based system to cause arbitrary code to be located and activated in a targeted process while the targeted process is running to provide activated code based on receipt of a message in the targeted process from a requesting process that is external to the targeted process while the targeted process is running, the message requesting dynamic execution of the arbitrary code in the targeted process, the message including a code identifier that identifies the arbitrary code, the code identifier being useable to locate and activate the arbitrary code; and
a second program logic module for enabling the processor-based system to provide a value that references the activated code, the value being callable by the requesting process to interact with the targeted process while the targeted process continues to run.

20. The computer program product of claim 19, wherein the message includes path information and a location identifier, the path information indicating a path to a code container, the location identifier indicating a location of a shared library; and     wherein the first program logic module comprises:
        activation logic for enabling the processor-based system to load the arbitrary code from the code container into the shared library based on the location that is indicated by the location identifier and further based on the path that is indicated by the path information; and
        calling logic for enabling the processor-based system to call into the shared library to execute the arbitrary code.

\* \* \* \* \*